United States Patent [19]

Leonard et al.

[11] 4,329,766

[45] May 18, 1982

[54] TOOL FOR INSTALLING SCARIFIER TEETH

[76] Inventors: James F. Leonard, P.O. Box 244, Bennett, Colo. 80102; John Lane, P.O. Box 502, Strasburg, Colo. 80136

[21] Appl. No.: 230,399

[22] Filed: Feb. 2, 1981

Related U.S. Application Data

[63] Continuation-in-part of Ser. No. 70,150, Aug. 27, 1979, abandoned.

[51] Int. Cl.³ .............................................. B23P 19/04

[52] U.S. Cl. ........................................................ 29/254

[58] Field of Search .......................... 29/254, 255, 275

[56] References Cited

U.S. PATENT DOCUMENTS 3,757,409 9/1973 Flanigan ................................ 29/254

3,769,683 11/1973 Krekeler ........................... 29/255 X

*Primary Examiner*—James G. Smith

*Attorney, Agent, or Firm*—Horace B. Van Valkenburgh

[57] ABSTRACT

A tool for installing scarifier teeth in a hole in a socket attached to a drum, as by using an identical pin and air hammer as can be used for removing the teeth through an aperture at the rear of the socket. The tool has a circular hole with an inner bevel at an angle of not less than 32½° but preferably 35° to the center line of the hole, while this bevel engages an outer bevel of a body of the tooth adjacent a shoulder to which weld metal attaches a tip of relatively hard metal to the body, or a flare or skirt of the body adjacent a stem of the tooth. The aforesaid holes in the body may be of different length and different diameter, depending on the distance from the point of the tip to the bevel or the flare or skirt. The opposite end of the tool is provided with a hole to receive a pin which may be impacted by an air hammer, while a shim may wedge the pin in this hole to prevent the tool from flying off the pin if the air hammer is accidentally triggered.

10 Claims, 7 Drawing Figures

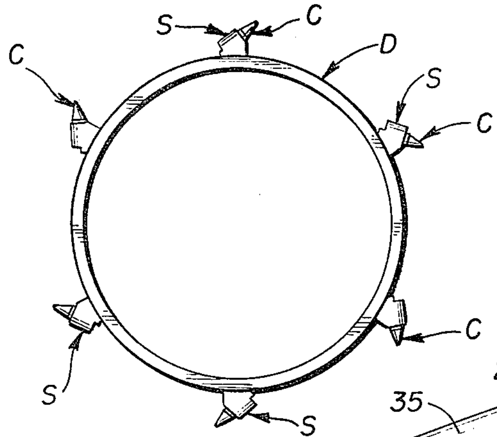
Fig. 1
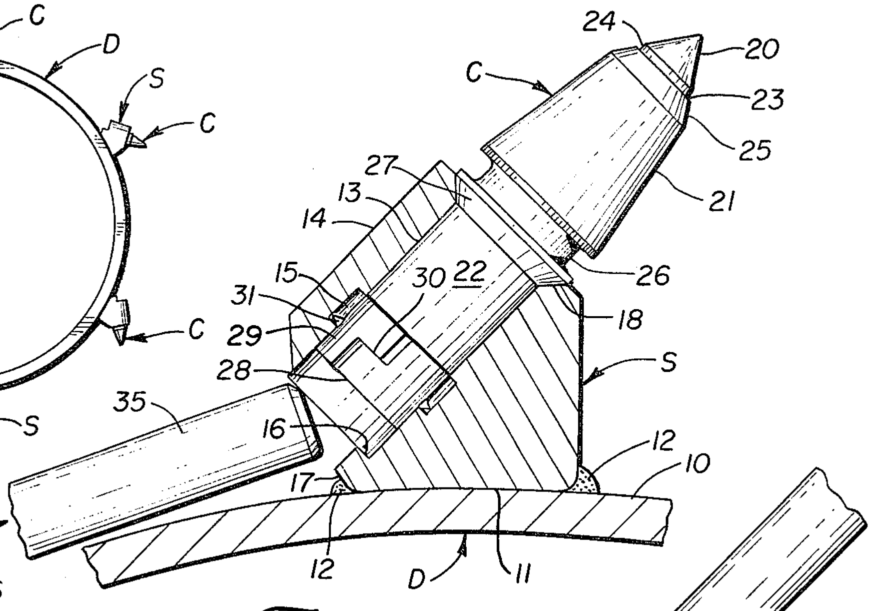
Fig. 2
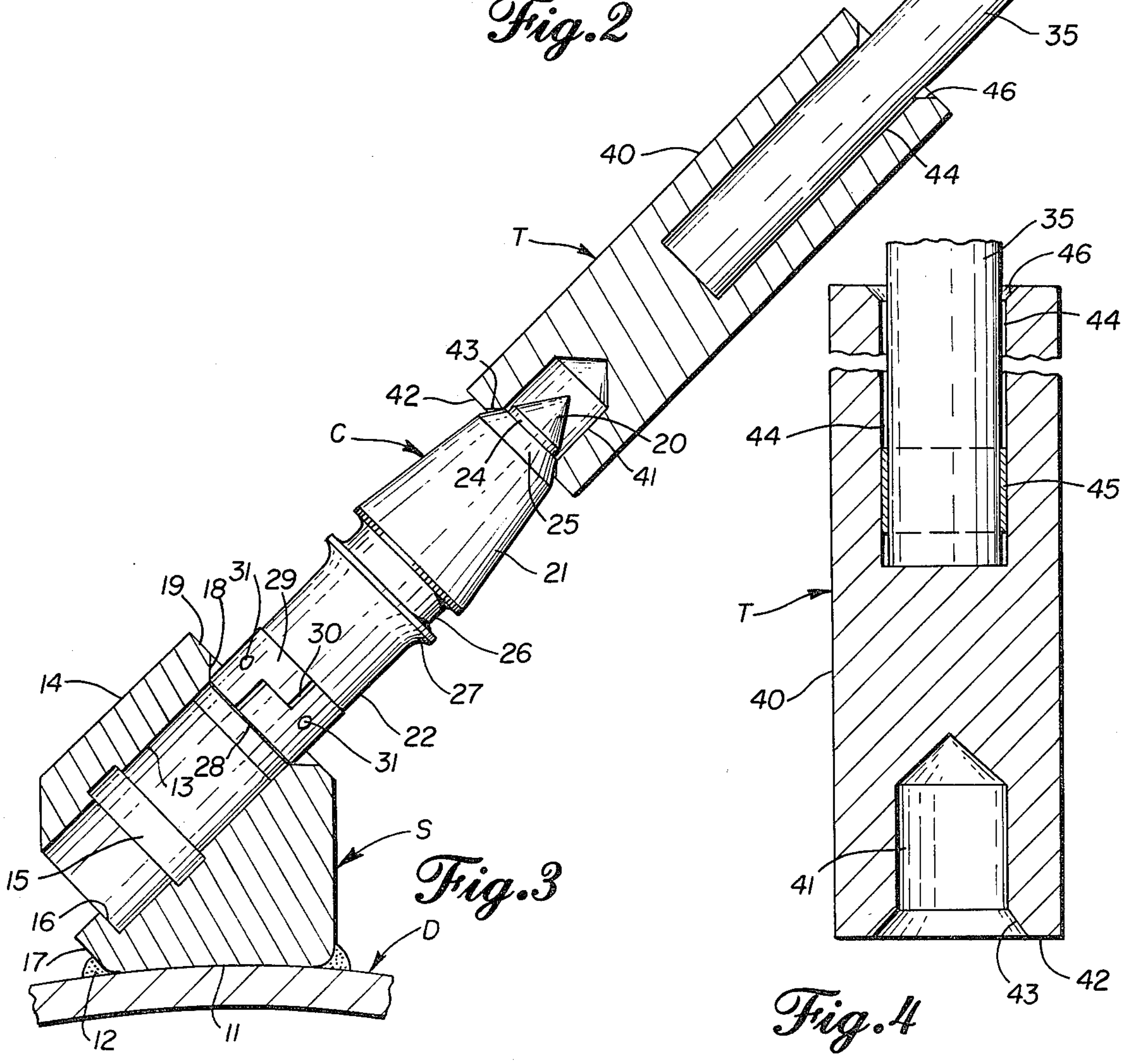
Fig. 3
Fig. 4

TOOL FOR INSTALLING SCARIFIER TEETH

This application is a continuation-in-part of application Ser. No. 70,150, filed Aug. 27, 1979, and now abandoned.

This invention relates to tools for installing scarifier teeth for ripping concrete, blacktop and the like.

BACKGROUND OF THE INVENTION

Scarifier teeth are normally installed in an angular position, as in a socket having a hole disposed at an angle, such as 45°, to the radius of a drum on which the socket is mounted, while an annular recess near the rear end of the hole is adapted to receive a spring which expands into the recess. This spring is contained in an annular slot near the rear of a rear stem of the tooth, which also has a body and, at the front end of the body, a tip of hard metal, such as tungsten carbide or an alloy having similar wear resistant qualities. This tip is predominantly circular, so as to fit into a central hole in the body, but has a conical point. The tip is normally held in place on the body by weld metal deposited around the periphery of the rear edge of the conical point.

The socket in which the tooth is installed has an at least partially open rear end, so that a pin, chisel or the like may be inserted into the socket to drive the tooth out of the hole when the tip is broken or worn, or the tooth should be replaced for some other reason. Normally, heavy hammers have been used to drive the teeth out of the sockets. The hole in the socket also has a bevel at its entrance, so as to compress the spring contained in the slot in the stem of the tooth, so that the tooth may be moved into the hole until the spring reaches the recess of the socket hole. Again, heavy hammers have been used in driving the teeth into the sockets, which has resulted in an undue amount of breakage of teeth, particularly the tips formed of relatively hard metal. In addition, the use of heavy hammers to drive worn or broken teeth out and to install new teeth requires an undue amount of time. Since the drum on which the sockets are located in both a radial and axial spaced relationship may be on the order of 3 feet in diameter and 8 to 10 feet wide, and may have on the order of 110 sockets and teeth, to drive out the broken or worn teeth with a heavy hammer and replace them again, with the use of a heavy hammer, requires an undue amount of time. Additional time is required, for heavy hammer operations, to drive out teeth that have been broken by installation with such a hammer and reinstalling new teeth. Certain users have experienced a necessity for replacing teeth for ripping asphalt every four hours, and to replace teeth for ripping concrete sometimes six times a day. Since the ripping machines are normally rented at a cost, in certain instances, of $500.00 per hour, excessive down time of the machines, particularly due to the amount of time involved in heavy hammer operations, is quite costly.

Among the objects of this invention are to provide a tool for installing scarifier teeth which enables a percussion instrument, such as an air hammer, to be utilized; to provide such a tool which is not required to engage the hard metal tip of the teeth, but rather a portion of the body of the teeth; to provide such a tool which does not tend to wedge on the tooth during installation; to provide such a tool which may be mounted on the drive pin of an air hammer, such as identical to that which may be used for driving the teeth out of the socket; to provide such a tool which may be readily manufactured, but with a variation to accommodate different styles of teeth, such as used for ripping concrete and for ripping blacktop; and to provide such a tool which is effective and efficient in operation and tends to have a relatively long, useful life.

U.S. Pat. No. 3,769,683 discloses a sliding hammer device provided with a pivoted loop which may be placed over a cutter bit for a mining, excavating or earth working machine to remove the bit when worn. A head member of the tool may be provided with a depression or recess which fits over the cone-shaped nose of that style of bit, with the hammer impacted against an appropriate flange to drive the tooth into a socket. However, the included angle between opposite interior surfaces of the conical recess is approximately 30°, i.e. the bevel on the inside of the recess is approximately 15° to the axis of the tool. Thus, such a tool is not adapted for use with scarifier teeth, since it tends to become wedged on the conical surfaces.

SUMMARY OF THE INVENTION

The foregoing problems attendant upon the installation of scarifier teeth are overcome by this invention through the use of a tool having a hole which will fit over a portion of the scarifier tooth, with a bevel at the outer edge of the hole, at an angle of at least $32\frac{1}{2}°$ but preferably 35° with respect to the axis of the tool, so that the included angle between opposite sides of the frusto-conical surface provided by the bevel will be at least 65°. This angle was found to be critical, since attempts to engage a conical surface of a tooth by a conical bevel of the tool having a lesser angle resulted in wedging of the tool on the tooth, with considerable difficulty and particularly considerable time involved in dislodging the tool, sometimes accompanied by removal of the tooth from the socket. A tool of this invention is particularly adapted, with the assistance of an air hammer or the like, to install a tooth for ripping concrete, which is provided with a hard metal tip and weld metal by which the tip is attached to the body of the tool, but an outer bevel of the body adjacent the weld metal which has a lesser inclination to the axis of the tool than the remainder of the tool body. The inner bevel of the tool engages the outer bevel of the tooth for impact of the driving force for installation of the tooth, but does not become wedged on the tooth. Teeth for ripping blacktop are larger in diameter than teeth for ripping concrete and have a larger tip with a conical point, while the body is conical at an extremely acute angle but does have an outwardly flaring skirt adjacent the rear stem. A tool of this invention for installing such teeth has a larger and longer hole extending to one end in order to surround not only the tip but also a majority of the body, so that the inner bevel at the entrance of the hole will engage the flaring skirt of the body.

Each tool of this invention is also provided with a hole at the opposite end which is adapted to receive a drive pin, conveniently identical to that which may be utilized for driving teeth from the sockets through use of an air hammer.

THE DRAWINGS

Additional objects and other novel features of this invention will become apparent from the description which follows, taken in conjunction with the accompanying drawings, in which:

FIG. 1 is a side elevation, on a reduced scale, of a rotatable drum on which is mounted a series of teeth for ripping concrete, blacktop or the like.

FIG. 2 is a fragmentary cross section of a portion of the drum and one of the sockets of FIG. 1, showing in full a tooth for ripping concrete installed in the socket, as well as a portion of a pin which is actuated by an air hammer and is adapted to drive the tooth from the socket.

FIG. 3 is a fragmentary cross section, with certain parts in full, showing the tooth of FIG. 2 and a tool constructed in accordance with this invention for installing the tooth in the socket, the tool being engaged by an air hammer pin which may be identical to that used for driving out the tooth.

FIG. 4 is a condensed longitudinal section, on an enlarged scale, of the tool of FIG. 3, showing also a portion of the air hammer pin.

DESCRIPTION OF THE PREFERRED EMBODIMENTS

Figures 5, 6, 7:
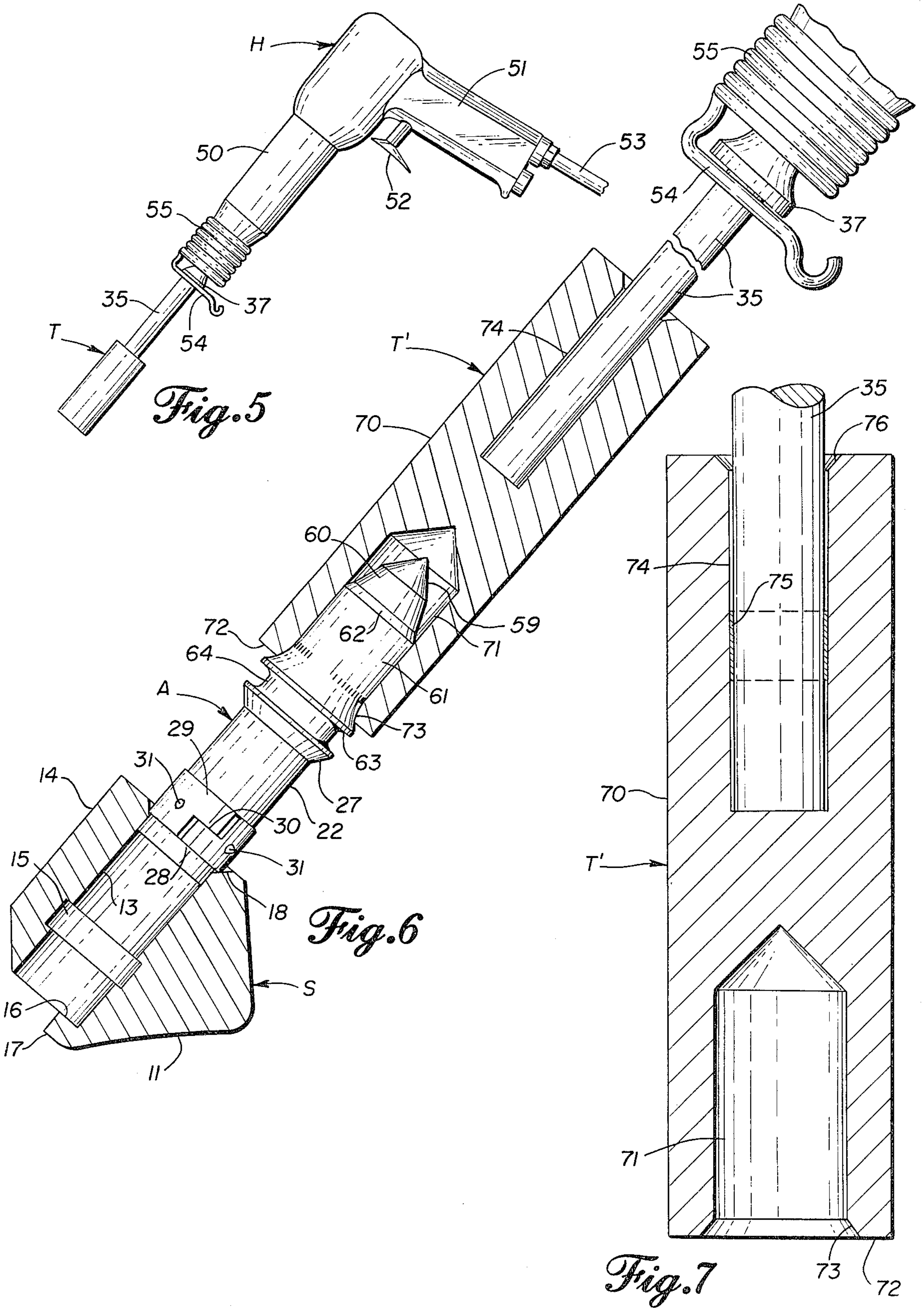
FIG. 5 is a condensed side elevation, on a reduced scale, of an air hammer or air gun, with the drive pin mounted therein and a tool of this invention mounted on the drive pin.
FIG. 6 is a fragmentary cross section similar to FIG. 4, but showing a tooth for ripping blacktop being installed in a socket through the use of an alternative tool of this invention, as through a drive pin of an air hammer.
FIG. 7 is a longitudinal section of the tool of FIG. 6, on an enlarged scale, showing also a portion of the drive pin inserted therein.

A series of scarifier teeth C, particularly adapted to be utilized for ripping concrete and also to be installed by a tool of this invention, are mounted, as in FIG. 1, in a series of sockets S on a rotatable drum D, which may be on the order of 3 feet in diameter, 8 to 10 feet wide and have on the order of 110 teeth distributed both circumferentially and axially about the drum. As in FIGS. 2 and 3, each socket S may be mounted on the outer surface 10 of the drum, as with a base 11 of the socket having a curvature corresponding to the outer surface of the drum and weld metal 12 extending around the periphery, or a suitable portion of the periphery, of base 11 to attach the socket to the drum. Since scarifier teeth are subject to considerable stress during rotation against the concrete or blacktop which is to be removed, the mounting of the sockets must be quite secure. Each socket may be provided with a hole 13 extending at an angle, such as 45°, to the radius of the drum, while a correspondingly angled, semicylindrical surface 14 surrounds the outer half of the hole 13 and provides sufficient thickness of metal around the hole to withstand the stresses imposed. Adjacent the inner end of hole 13 is an annular recess 15 for a purpose described below, while the lower portion of the rear end of hole 13 terminates in an abutment 16 formed by a lower corner 17 of the socket. The outer end of hole 13 may be provided with a bevel 18, as at 45°, to facilitate installation of a tooth C, as described below. The socket S is generally rectangular in configuration, except for the angled semicylindrical surface 14 and a 45° surface 19 surrounding the outer end of hole 13.

The tooth C illustrated in FIGS. 2 and 3, but in the installed position of FIG. 2, is particularly adapted for ripping concrete, as indicated. Tooth C has an outer tip 20, a body 21 and an inner stem 22 having a diameter slightly less than hole 13 in socket S. Tip 20 is made of a hard metal, such as tungsten carbide or an alloy having similar properties, and has a conical end, as shown, but is otherwise cylindrical, for insertion in a central hole within body 21 of the tooth. Body 21 is also conical but principally at an included angle on the order of 10°, while its outer end forms a shoulder 23. The top 20, when seated in the hole, is attached to the body of the tooth by weld metal 24, which normally does not extend outwardly to the edge of shoulder 23. Rearwardly of shoulder 23 is an outer bevel 25 which forms a frustoconical surface at an angle of approximately 25° to the axis of the tooth or an included angle of 50°. Bevel 25, although less than 35° to the axis, still cooperates in a unique manner with a tool of this invention, in a manner described later. Between body 21 and stem 22 is an interiorly rounded groove 26 which extends to a flare or skirt 27 of the stem, the latter being adapted to seat against the bevel 18 of socket S when the tooth is installed, as in the position of FIG. 2. Spaced from the lower end of the tooth is a groove 28 which receives an annular spring 29 having an overlapping joint 30 which permits the spring to retract and expand in the groove 28. On spring 29, a series of outwardly conical projections 31, having a blunt outer end, engage the inner wall of hole 13, while the tooth is being inserted in the socket, thereby reducing the frictional resistance to movement of the stem into hole 13. When the tooth is seated in the socket hole, as in FIG. 2, with the rear end of the tooth adjacent abutment 16, and the flare 27 seated against bevel 18, the projections 31 will expand into the recess 15, thereby retaining the tooth against dislodgement from the socket. As illustrated in FIG. 2, a drive pin 25 actuated by an air hammer, such as the Chicago Pneumatic Tool Company CP717 heavy duty air hammer, may be utilized in removing the tooth from the socket, as by impacts produced in the direction of the arrow 36, to cause the spring 29 to retract and the tooth to be driven from the socket. As in FIGS. 5 and 6, drive pin 35 is provided with a flange 37 spaced from its inner end, for the purpose of preventing its accidental release from an air hammer H, in a manner described later.

As indicated previously, a workman can drive out a number of teeth which need to be replaced from the socket and insert a new tooth in each socket, as in the position of FIG. 3, in which the spring 29 has engaged the bevel 18 and become compressed enough to retain the tooth in the socket until a tool T of this invention and adapted to be mounted on the same type of drive pin 35 used in removing the teeth from the socket, can be used to drive the tooth into the socket. As the tooth C is driven into the socket, spring 29 is further compressed and each tooth moved into the hole 13, until flare 27 seats against bevel 18 and spring 29 expands into recess 15. Such a tool T may be formed from a cylinder 40 of suitable metal by producing a hole 41 extending from one end 42 and also producing a bevel 43 which extends around the outer edge of the hole 41 at an angle of at least $32\frac{1}{2}°$ but preferably 35° to the axis of the tool, so as to form an interior conical surface having an included angle of at least 65° and preferably 70°. The use of a bevel at an angle of $32\frac{1}{2}°$ and preferably 35° to the axis of the tool is important because it has been found that the tool will wedge on the tooth if the angle of the interior bevel is less than $32\frac{1}{2}°$ to the axis of the tool, i.e. if the included angle between the sides of the interior cone is less than 65°. Since placement of the tool directly against the tip 20 tends to result in destruction of the tip, similar to the destruction of the tip when the tool is attempted to be installed with a heavy hammer, the diameter of hole 41 of the tool is not only greater than the diameter of tip 20 but also preferably greater than the extension of weld metal 24, so that interior bevel 43 of the tool will engage outer bevel 25 of the tooth, at or adjacent the edge of shoulder 23. This avoids any tendency for the tool to tend to wedge on the tooth.

The same air hammer can be used to install the tooth as is used to remove the tooth. Thus, a cylindrical hole 44 extends from the opposite end of the tool for a distance sufficient to accommodate the drive pin, which may be the same drive pin as is used for driving out the tooth, as in FIG. 2, although it is somewhat preferable to use a different drive pin for driving out the teeth, since the end which engages the teeth tends to become upset and spread out. In addition, it may be found desirable to provide a separate drive pin for each tool, so that the tool may be fastened to the drive pin, as by a shim 45 of FIG. 4, to prevent the tool from being ejected from the drive pin if the trigger of the air hammer is accidentally pushed. The entrance of hole 44 may be provided with a bevel 46, as at 45°, to facilitate entry of the drive pin and/or the shim 45. Although one workman may drive out a series of teeth to be replaced, then change to a drive pin on which a tool of this invention is mounted, for installing new teeth in the empty sockets, a saving in time can be obtained if two air hammers are used by separate workmen, one operating an air hammer provided with a drive pin for driving out the teeth to be replaced and the other with a drive pin on which a tool of this invention is mounted, for installing the new teeth. Either workman may place the new teeth in the empty sockets, as in the position of FIG. 3.

As illustrated in FIG. 5, an air hammer H corresponding to the Chicago Pneumatic Tool Company air hammer CP717 has a barrel 50 and a handle 51, with which is associated a trigger 52, while an air hose 53 extends from the end of the handle. A drive pin 35, on which a tool T may be mounted is inserted in a reciprocating chuck (not shown) inside barrel 50, while a loop 54 of a coil spring 55 may be placed over flange 37 of the drive pin, to insure that the drive pin is not ejected from the hammer, in the event that the hammer is accidentally actuated.

A tooth A, shown in FIG. 6, may be installed in and removed from the same socket S in which the tooth C of FIGS. 2 and 3 is installed in and removed from. The tooth A is particularly adapted for ripping asphalt or blacktop, but is provided with a stem 22 identical to that of tooth C, i.e. having a flare 27 for abutting bevel 18 of the socket S and a groove 28 for receiving spring 29 having a joint 30 and projections 31. Spring 29 is compressed by bevel 18 as it moves into the hole 13 of socket S, but expands when it reaches recess 15 in the socket, as before. The tooth A has a tip which includes a conical outer end 59 and a frusto-conical portion 60, as well as a body 61. The diameter of the forward end of body 61, whose conical sides are inclined at an extremely small angle, such as on the order of 5° to the axis of the tooth, and of the rear end of the head of tip portion 60 are such that the weld metal 62 normally extends outwardly to the edge of the front of body 61. However, the rear end of body 61 is provided with a flaring skirt 63 which is inclined at an angle on the order of 35° to the axis of the tooth, i.e. the flaring skirt 63 has an exterior frusto-conical surface, the included angles between the sides of which are approximately 70°. A rounded groove 64 separates skirt 63 and flare 27 of stem 22.

For installing the tooth A with the same type of air hammer and drive pin, such as air hammer H and drive pin 35 of FIG. 5, tool T' of FIGS. 6 and 7 may be formed from a cylinder 70 having a central hole 71 which extends from one end 72 and which is of sufficient diameter to surround the tip and that portion of the body between the tip and the flaring skirt 63. The outer edge of hole 71 is provided with a bevel 73 which is inclined at an angle of at least $32\frac{1}{2}°$ but preferably 35° to the axis of the tool, to form an interior frusto-conical surface, the included angle between the opposite sides of which is at least 65° but preferably 70°. As in FIG. 6, bevel 73 engages the skirt 63 of the tooth, so that not only do impacts transmitted to the tooth by engagement of bevel 73 with flaring skirt 63 drive the tooth A into the corresponding socket, but also the tool may be readily removed from the tooth without wedging, due to the angle of the bevel. A hole 74 which receives a drive pin 35 extends inwardly from the opposite end of cylinder 70, while a shim 75 may surround drive pin 35, for more securely attaching the drive pin to the tool. Shim 75 is conveniently wedged between the drive pin and hole 74, the outer end of which may be provided with a bevel 76, as at approximately 45°, to assist in insertion of the shim 66. The tool T' of FIGS. 6 and 7 may be used with an air hammer in the same manner as tool T of FIGS. 3–5, i.e. mounted on or attached to a drive pin 35 which is mounted in the air hammer, as in FIG. 6, with a spring loop 54 placed over flange 37 of the drive pin.

Although the tool of this invention is particularly adapted for installing scarifier teeth for concrete and blacktop, with the diameter and length of the hole which encircles a portion of the tool being provided in accordance with the diameter of the tooth to the surface to be engaged by the inner bevel of the tool, it will be understood that variations in the tool may be made to accommodate different designs of scarifier teeth, and particularly changes in the design of teeth for ripping concrete and of teeth for ripping blacktop. Thus, it will be understood that various changes may be made without departing from the spirit and scope of this invention.

What is claimed is:

1. A tool for installing a scarifier tooth in a socket attached to a rotatable drum, said socket having a hole inclined to a radius of said drum and a groove receiving an annular spring surrounding a recess in a stem of said tooth, said tooth having a generally conical tip formed of relatively hard metal extending from one end of a body of said tooth, said tooth having weld metal attaching said tip to said body at the position of emergence of said tip from said body and an outer bevel between said weld metal and said stem, said tool comprising:

an elongated member having a hole extending generally centrally into said member from one end, an inner bevel extending around said hole at said end at an angle of not less than $32\frac{1}{2}°$ to the center line of said hole so as to form an interior frusto-conical surface having an included angle of not less than 65° between opposite sides thereof and means at the opposite end of said member for driving attachment to a device for imparting impacts to said tool corresponding to impacts of an air hammer or the like; and said hole in said tool having a diameter to surround said tip and any portion of said body between said tip and said outer bevel.

2. A tool as defined in claim 1, wherein:
said inner bevel of said tool has an included angle of at least 70°.

3. A tool as defined in claim 1, wherein:
said means for driving attachment to a device for imparting impacts to said tool comprises a second hole at said opposite end for receiving a drive pin attachable to a hammer which produces impacts against said drive pin, said drive pin being of a type and size useable with said hammer for removing said tooth from said socket, said socket having an aperture at one end of said hole opposite the end into which said tooth is inserted for installation and said drive pin being insertable through said aperture into engagement with said tooth.

4. A tool as defined in claim 3, including:
means for securing said drive pin in said second hole.

5. A tool as defined in claim 4, wherein:
said securing means comprises a shim wedged between said drive pin and the wall of said second hole.

6. A tool as defined in claim 5, including:
a bevel at the outer end of said second hole to assist in introduction of said shim.

7. A tool as defined in claim 1 for a tooth whose outer bevel is a flaring skirt adjacent said stem, wherein:
said tool hole extends over the top and body of said tooth to said flaring skirt.

8. A tool as defined in claim 7, wherein:
said means at the opposite end of said tool member for driving attachment to an impact device comprises a hole for receiving a drive pin of a type and size usable with said impact device to remove said tooth from said socket through an aperture connecting with the rear end of said hole; and
a shim wedged between said drive pin and the wall of said second hole for securing said tool to said drive pin.

9. A tool as defined in claim 1 for a tooth whose outer bevel is adjacent said weld metal, wherein:
said hole at said one end of said tool has a diameter and length to surround said tip with the inner bevel of said tool engaging the outer bevel of said body adjacent said shoulder.

10. A tool as defined in claim 9, wherein:
said means at the opposite end of said tool member for driving attachment to an impact device comprises a hole for receiving a drive pin of a type and size usable with said impact device to remove said tooth from said socket through an aperture connecting with the rear end of said hole; and
a shim wedged between said drive pin and the wall of said second hole for securing said tool to said drive pin.

* * * * *